Sept. 27, 1949.　　　　　L. GILBART　　　　　2,483,340
WARDROBE

Filed Aug. 28, 1945　　　　　　　　　　　2 Sheets-Sheet 1

Inventor:
Louis Gilbart
By Cushman Darby Cushman
attys.

Sept. 27, 1949.                L. GILBART                2,483,340
                                WARDROBE
Filed Aug. 28, 1945                                2 Sheets-Sheet 2

Patented Sept. 27, 1949

2,483,340

UNITED STATES PATENT OFFICE 2,483,340

WARDROBE

Louis Gilbart, Leeds, England

Application August 28, 1945, Serial No. 613,056
In Great Britain July 12, 1944

Section 1, Public Law 690, August 8, 1946
Patent expires July 12, 1964

1 Claim. (Cl. 312—144)

This invention relates to wardrobes and the like and has for its chief object to provide a new or improved construction of wardrobe which can be folded into relatively small space for transport, export and storage.

According to the invention the wardrobe and like has a hinged top, bottom and back, in such a manner that the top can be lowered, the bottom raised and the side walls brought together to form a compact article.

In order that the invention may be clearly understood and readily carried into effect the same will now be more fully described with reference to the accompanying drawings.

Figure 1:
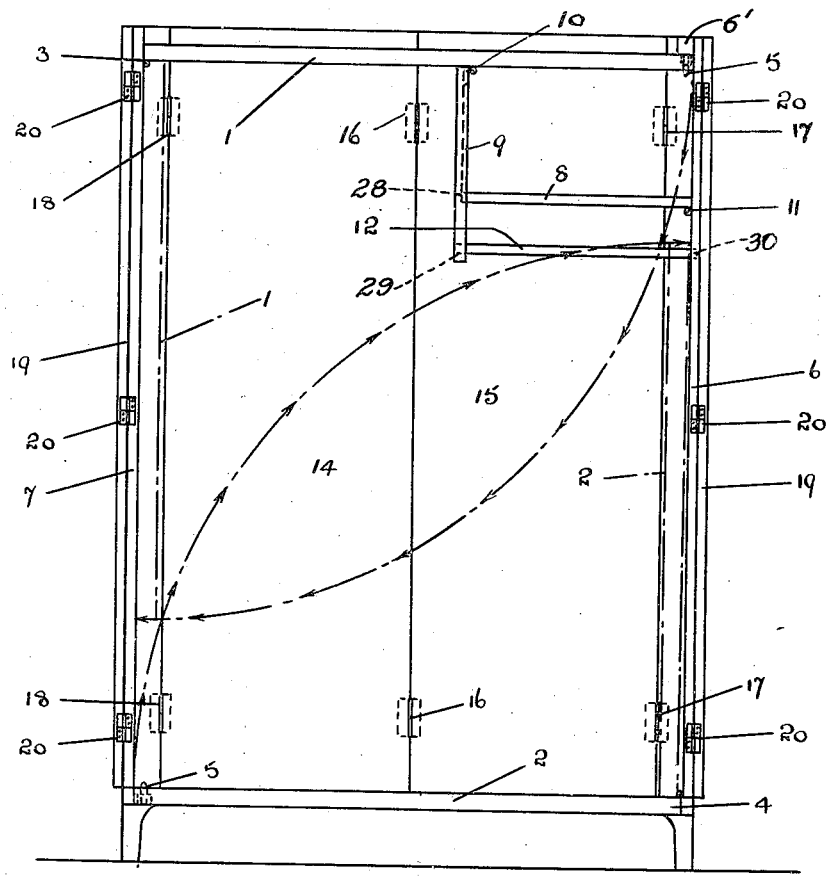
Figure 1 is a front elevation of the wardrobe in its extended position with the doors folded back to show the method of folding which is indicated by the arrows.

Referring to the drawings, the top 1 and bottom 2 portions of the wardrobe are hinged to the top and bottom of the opposite sides at 3 and 4 and are secured by a self locking catch indicated generally as 5. To fold up the catch 5 is pulled back and the bottom 2 is folded back to a vertical position resting against the side wall 6. The top 1 is released in the same manner, the catch 5 being on the opposite side to the bottom portion, allowing the top 1 to fold downwards against the side wall 7 on the opposite side to the bottom portion 2.

Figure 3:
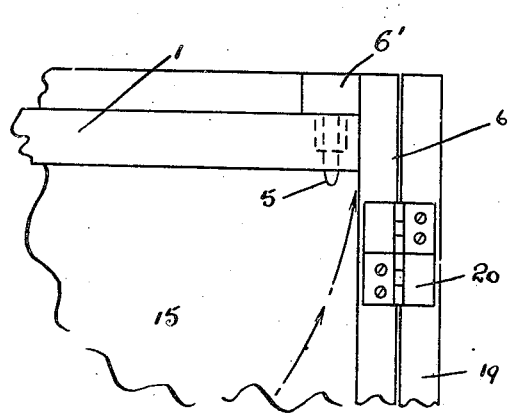
Figure 3 is a detail view showing the catch holding the top of the wardrobe in its raised position.
Figure 2:
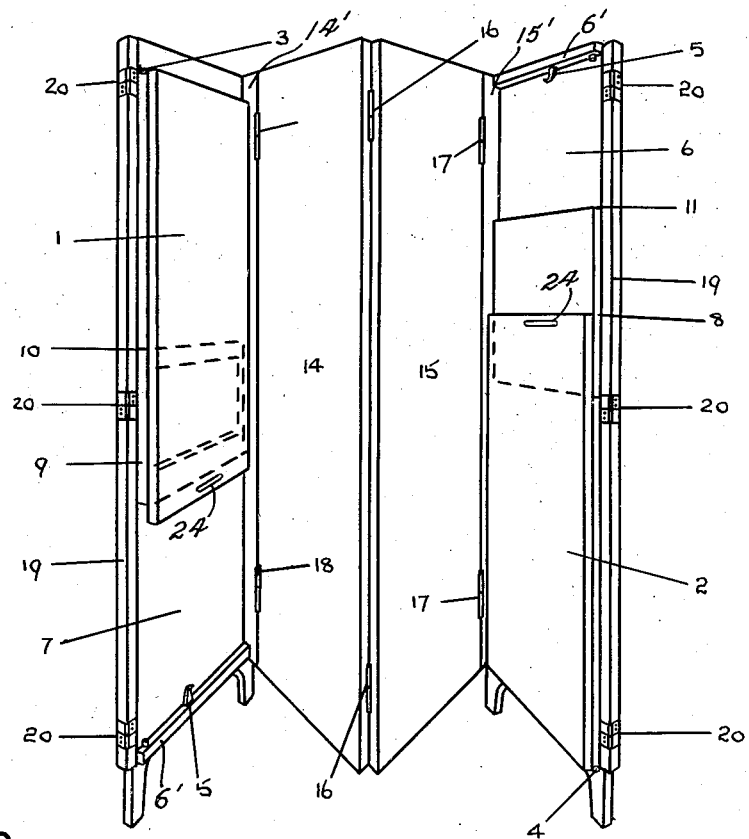
Figure 2 shows the wardrobe partially folded.
Figures 4, 5:
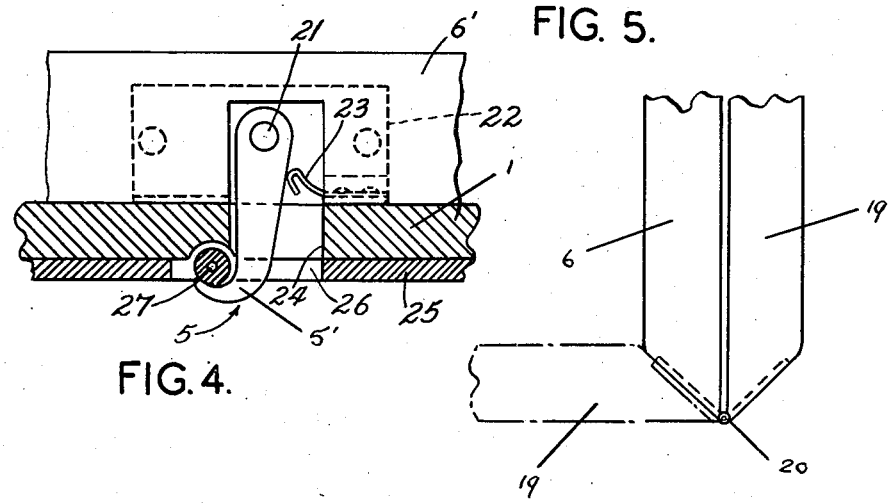
Figure 4 is a detail view of the catch shown in Figure 3.
Figure 5 is a detail plan showing a hinge of the door.

As best shown in Figures 1 and 3, the top 1 is in raised position with its free end engaging the catch 5, which is secured to a member 6', and the latter may be secured to the side wall 6 by screws or other suitable means not shown. In Figure 4 is shown an enlarged detail view of the catch 5, which comprises a hook 5' pivoted at 21 to an L-shaped bracket 22 secured behind or within the member 6'. A spring 23 carried by the bracket 22 is arranged to engage one side of the hook 5' and yieldably maintain the hook 5' in engagement with the roller 27, as shown. The top 1 is slotted at 24, and has suitably secured to its underside a plate 25, similarly slotted at 26 to permit entry therethrough of part of the hook 5', and said plate 25 carries the roller 27 capable of being engaged by the hook 5' in the manner shown. It will be seen that when the top 1 is moved to its raised position the hook 5' will releasably maintain the same in a horizontal position, and that it may be readily released against the action of the spring 23 to assume its folded position. Although the hook shown in Figure 4 is associated with the top 1, it may be used without alteration for the bottom 2.

The hat shelf 8, which is released before the top portion 1 is lowered, is not more than half the width of the wardrobe and has a vertical end 9 hinged at 10 to the top 1, the shelf 8 being hinged at 11 to the side wall 6 and its free end rests on a ledge 28 formed on the vertical part. Underneath the shelf 8 there is the usual hanging rail 12, which is the only part of the wardrobe detachable when the wardrobe is folded together. The vertical end 9 is provided with a hole 29, and the side 6 with a socket 30 for reception of the rail 12. An extensible clothes rail (not shown) may be mounted beneath the top and folds flat when the top is lowered.

The back which is in two parts 14, 15 is hinged centrally at 16 on the outside and hinged as at 17 and 18 to intermediate strips or members 14' and 15' to which the adjacent side walls 6 and 7 are connected, so that the central part of the back can be folded inwards forwardly and the side walls 6 and 7 moved towards each other in one movement. The interposing of the strips 14' and 15' between the back panels and the side panels provide means which enable the folded top 1 and folded bottom 2 to be conveniently accommodated between these parts when the side panels 6 and 7 are folded, without jamming or disturbing the hinged connections 17 and 18.

The doors 19 are hinged at 20 so as to be capable of being folded back against their respective sides.

When folded up the height of the wardrobe and like is not altered but the width of a 4' wardrobe folds to 8" and the depth may be half the width when folded. Thus, it will be seen that the latch 5 is a pivotal hook member carried on battens secured to the top of one side wall 6 and the bottom of the other side wall 7. These latches engage and lock the top 1 and bottom 2 in their horizontal positions when the wardrobe is erected by engaging rollers carried in slots formed one in the top 1 and bottom 2. The latch 5 is spring loaded so that when the top or bottom is being moved into the horizontal position the roller rides over the end of the latch and the latter moves against its spring to permit the roller to pass over the curved end of the latch, whereupon the latch springs into place to hold the roller and the top or bottom securely in place. Moreover, the rail 12 is detachable and is held in position by entering recesses in the side wall 6 and the vertical end 9.

*Method of folding.*—The usual double doors will be hinged to the side walls on special pivot hinges in such a manner that they may be folded back onto the side walls so that when the latter are moved together each door lies flat against its adjoining side wall. The usual mirror fitments will be let in flush on the inside of either of the doors.

The joints are constructed so that they are dustproof.

The construction can be applied to wood or metal and carried out in any design.

I claim:

A folding wardrobe composed of two side panels, two back panels and two door panels, adjacent panels being hinged together longitudinally, a top panel hinged to a side panel so that it may be lowered and folded against the side panel, a bottom panel hinged to a side panel so that it may be raised and folded flat against the side panel, the panels being hinged together so that they can be opened to form a wardrobe held rigid by the top and bottom panels and when folded brought together to form a flat compact unit, said top panel having a vertically depending side hinged to the underside thereof, one of the side panels adjacent the vertical side having a horizontal shelf hinged at one end to its inner side, and means when the panels are opened for detachably connecting the horizontal shelf to the vertical side to form a compartment in the wardrobe.

LOUIS GILBART.

REFERENCES CITED

The following references are of record in the file of this patent:

UNITED STATES PATENTS

| Number | Name | Date |
|---|---|---|
| 228,141 | Tocci | May 25, 1880 |
| 680,206 | LaMar | Aug. 6, 1901 |
| 963,853 | Benson | July 12, 1910 |
| 1,576,284 | Jones | Mar. 9, 1926 |

FOREIGN PATENTS

| Number | Country | Date |
|---|---|---|
| 412,372 | France | July 11, 1910 |